United States Patent [19]

Jandrasi

[11] Patent Number: 4,458,879

[45] Date of Patent: Jul. 10, 1984

[54] VALVE

[75] Inventor: Frank J. Jandrasi, Houston, Tex.

[73] Assignee: General Signal Corporation, Rochester, N.Y.

[21] Appl. No.: 397,394

[22] Filed: Jul. 12, 1982

[51] Int. Cl.³ .................................... F16K 3/316
[52] U.S. Cl. ................................. 251/326; 251/328;
251/360; 137/375
[58] Field of Search .................. 251/326, 328, 360

[56] References Cited

U.S. PATENT DOCUMENTS

| 2,787,438 | 4/1957 | Bauer | 251/326 |
| 2,838,066 | 6/1958 | Harris | 251/326 X |
| 3,232,577 | 2/1966 | Sargent | 251/326 X |
| 3,746,305 | 7/1973 | Zakka | 251/360 |
| 3,964,507 | 6/1976 | Jandrasi et al. | 251/326 X |

Primary Examiner—Arnold Rosenthal
Attorney, Agent, or Firm—Martin LuKacher; J. S. Mednick

[57] ABSTRACT

Disclosed is a valve in which the valve internals, the valve seat, guides and slide valve are maintained in position solely by a clamping action of a quick make-up cylinder having an inlet flow passage into the valve. The valve is particularly suited for small valves as no screws or other fasteners are used to maintain the valve internals in position. Advantageously, the guides and slides are maintained out of the flow path, and the valve internals, including the cylinder, are readily removable through the bonnet area.

7 Claims, 4 Drawing Figures

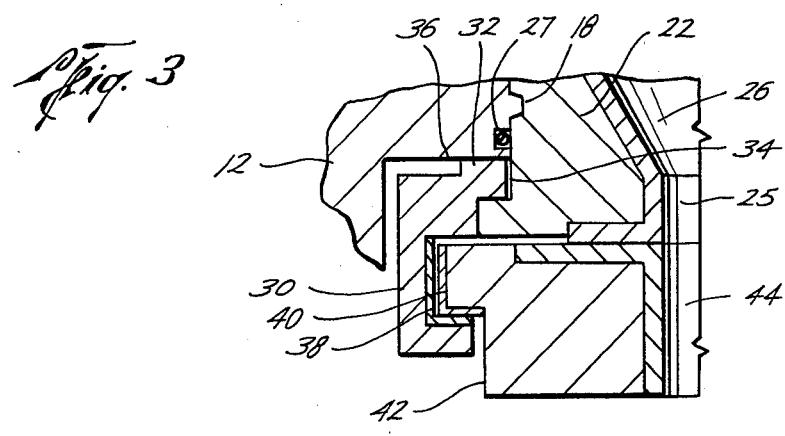
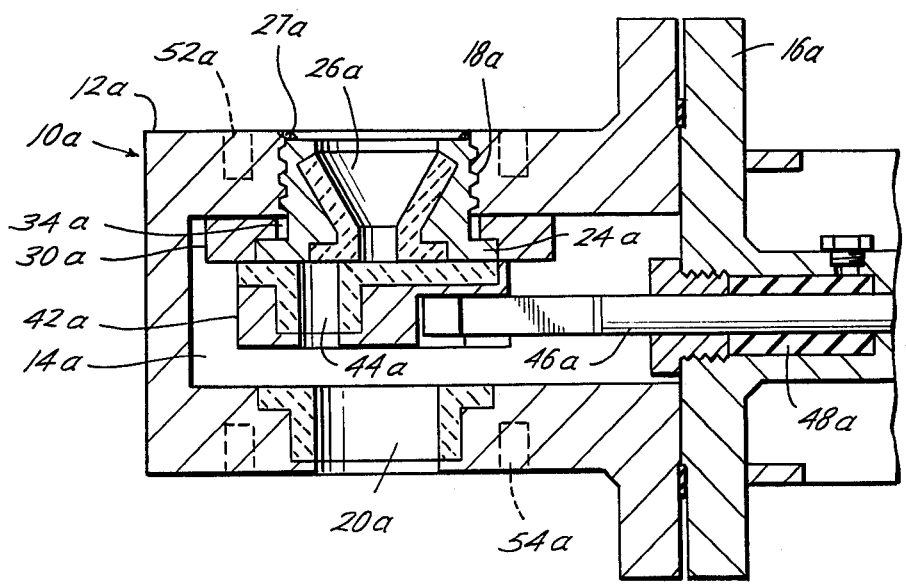

VALVE

BACKGROUND OF THE INVENTION

In slide valves of very small sizes there is not sufficient space to secure the valve internals in place by means of screws, bolts, and the like. It would be highly desirable to provide a slide valve in which the valve internals are maintained in place solely by quick make-up connection without the use of screws, bolts, and the like. This is particularly advantageous in small valves for a variety of applications, such as used for slurry flow through the valve, referred to as slurry let down valves. Applicant is not aware of any prior art slide valve utilizing this type of arrangement.

SUMMARY

The present invention is directed to such a valve.

In summary, a preferred embodiment of the valve comprises a body having an internal chamber and an inlet and an outlet leading into and out of the internal chamber. A cylinder having a flow passage through it is threadedly and releasably secured in the inlet and has a valve seat disposed at its inner end. A flange is disposed on the inner end of the cylinder which extends outwardly in the chamber beyond the inlet wall. A slide valve is slidably disposed in the internal chamber and guides for guiding the slide valve into open and closed position are maintained in position in the internal chambers solely by a clamping action of the flange against the inlet wall of the internal chamber. The outlet constitutes the outlet end of the flow passage through the valve body. No screws or other additional fasteners are utilized to maintain the valve internals, that is the valve seat and the guides in the valve body, and the slide valve guided in its movement by the guides, and these internals and the cylinder are removable through the bonnet area of the valve. Any desired means may be utilized to move the slide valve into its open and closed positions.

Accordingly, it is an object of the present invention to provide a valve in which valve internals are secured into position by a single quick make-up connection without the use of additional connectors, such as screws, bolts, and the like.

A further object of the present invention is the provision of such a valve which is well suited and adapted to be made in very small sizes in which there is not sufficient room for additional connectors, such as screws, bolts, and the like.

A further object of the present invention is the provision of such a valve which is particularly suitable for use in controlling flow of slurries as well as other abrasive and erosive flows.

A further object of the present invention is the provision of such a valve which may be assembled and disassembled quickly and readily and in which the valve internals can be removed through the bonnet area for repair and replacement.

Other and further objects, features, and advantages are inherent in the valve or are set forth throughout the specification and claims.

BRIEF DESCRIPTION OF THE DRAWINGS

FIG. 3 is a partial sectional view taken along the line 3—3 of FIG. 1.

FIG. 4 is a view similar to that of FIG. 2 illustrating a modification according to the invention.

DESCRIPTION OF PRESENTLY PREFERRED EMBODIMENTS

Figure 1:
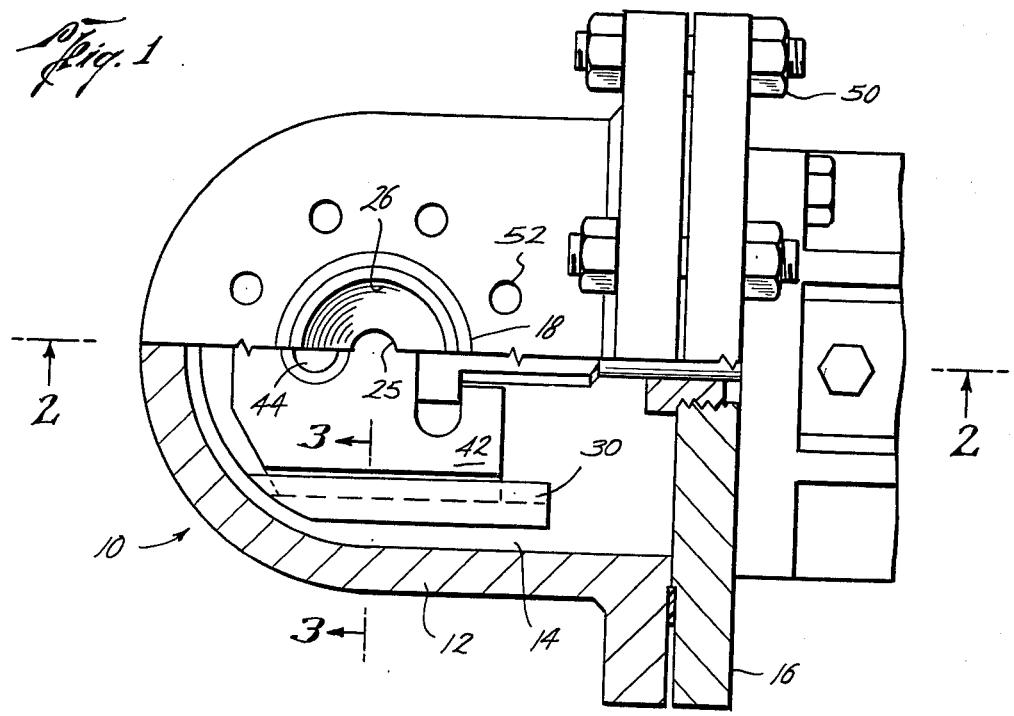
FIG. 1 is a plan view with a quarter section broken away illustrating a slide valve according to the invention.
Figure 2:
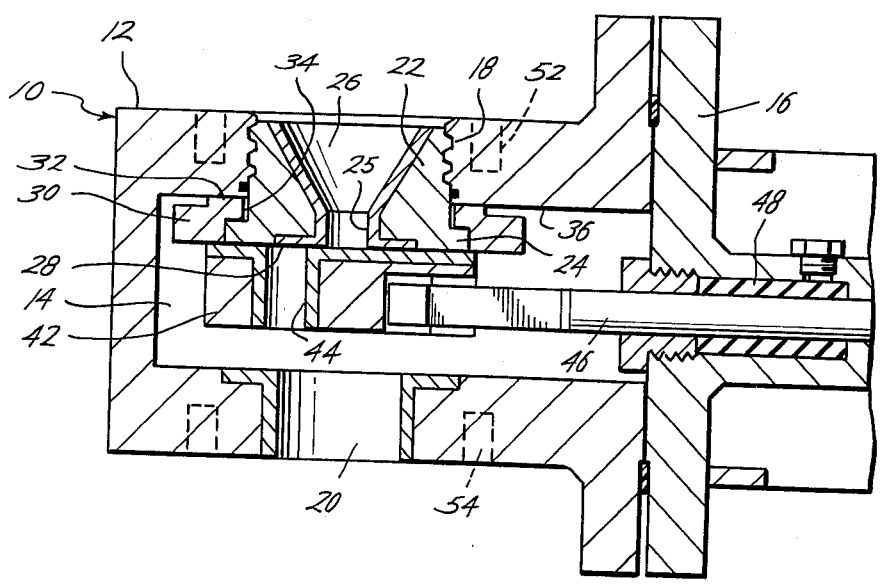
FIG. 2 is a sectional view taken along the line 2—2 of FIG. 1.

Referring now to the drawings, and particularly FIGS. 1 and 2, the slide valve is generally designated by the reference numeral 10 and has the body 12 which has an internal chamber 14 releasably closed by the cover or bonnet 16. The body 12 has an inlet 18 which extends into and is in fluid communication with the internal chamber 14 and has the outlet 20 also in fluid communication with the internal chamber 14.

A cylinder 22 is releasably secured in the inlet 18 by a quick make-up connection, here shown as acme threads and is provided with an outwardly extended circumferential flange 24 at its inner end. The cylinder 22 has a tapered or cone shaped inlet flow passage 26, a port passage 25, and terminates with a valve seat 28 at its inner end. The flange 24 extends outwardly beyond the inlet opening 18 as best illustrated in FIGS. 2 and 3. The port passage 25 can take any shape desired for the particular condition of use; for example, cylindrical, multisided, tapered and the like.

While acme threads are illustrated as the quick make-up connection between the inlet 18 and the cylinder 22, any desired quick make-up connection, such as slots and pins and the like can be used. Accordingly, the term "threaded" as used herein means and includes threaded connections, pins and slots and the like.

The cylinder 22 is sealed, such as by the O-ring and groove, collectively referred to by the reference numeral 27 for convenience, and as best illustrated in FIG. 3; although any desired sealing of the cylinder 22 in position can be used, such as the seal weld 27a in FIG. 4.

A guide plate 30 is provided which has an inwardly extending flange 32 and has a circular opening 34 of a diameter sufficient that the cylinder 22 can be placed through it so that when the cylinder 22 is connected in the body 12 as illustrated, the circular flange 24 maintains the guide plate 30 in position by the clamping action of the flange 24 clamping the guide plate 30 against the inner inlet wall 36 of the internal chamber 14.

As best seen in FIG. 3, to which reference is now made, the guide plate 30 has the guides 38 disposed on each side into which the slides 40 of the slide valve 42 interfit so that the interfitting guides 38 and slides 20 guide the slide valve 42 throughout its movement into open, partially open, and closed positions.

Referring again to FIG. 2, the slide valve 42 has the flow passage 44 extending through it positioned and of a size so that when the slide valve is in open position, for example as illustrated in FIG. 3, the flow passage through the valve will be open, but when the slide valve 42 is in a fully inward position, flow throughout the valve will be shut off. If desired, of course, the flow passage 44 can be omitted and the end of the slide valve 42 is then withdrawn sufficiently to open the valve.

The slide valve is connected to the stem or arm 46 extending through the stuffing box 48 in the bonnet 16 and can be actuated manually, pneumatically, mechanically or hydraulically, as desired. The stuffing box 48 can be of any desired type or suitable type, and, accordingly, no detailed description thereof is deemed necessary or given.

As best seen in FIG. 1 the bonnet 16 is secured to the body 12 by means of the nuts and bolts generally designated by the reference numeral 50, and the body 12 is tapped at 52 and at 54 around the inlet 18 and outlet 20 for securing or connecting pipe or other conduits to the valve body 12. The pipe or conduit, not shown, however, may be connected to the body in any desired manner.

As illustrated in FIG. 2, the inlet flow passage 26 and orifice plate of the valve seat 28, the slide valve surface and opening in the slide valve 44 and flow path outlet 22 are suitably hardfaced to withstand the flow through the slide valve.

Referring to FIG. 4 an embodiment is illustrated which is the same as that of FIG. 2 except that refractory linings are provided instead of hardfacing linings. In the embodiment of FIG. 4, the reference letter "a" has been added to numerals designating corresponding parts in FIG. 2 for convenience of reference. Other than substituting a refractory lining for a hardfaced lining, and the use of the seal weld 27a instead of the O-ring 27, the embodiment of FIG. 4 is the same as that of FIG. 2 and functions in the same manner. Accordingly, no further description of the embodiment of FIG. 4 is deemed necessary or given.

Since any desired hardfacing material or refractory material can be used as a lining to withstand the conditions of use, which are readily available on the market, no further description of these materials is deemed necessary or given.

To assemble the slide valve 10, with the bonnet or cover 16 removed, the cylinder 22 with the guide plate disposed about it as illustrated is inserted into the internal chamber 14 and quickly threaded into position. This maintains the guides 38 in position. The slide valve 42 is then moved into position by the slides 40 interfitting into the guides 38. The stem 46 is then attached to the slide valve 42 in its outermost position and the cover 16 is then bolted to the body 12 as illustrated in FIG. 1. The slide valve is then ready for operation, movement of the stem 46 sliding the slide valve 42 into and out of open, partially open, and closed positions. If a seal weld 27a is used, the seal weld can be applied anytime after the cylinder 22a is in place. If an O-ring 27 is used, it is put in place before the cylinder 22 is connected in place.

To disassemble the valve for maintenance, repair or replacement of parts, the bonnet 16 is removed and the stem 46 and slide valve 42 is pulled out of the internal chamber 14. The cylinder 22 is then disconnected and removed along with the guide plate 30. In the embodiment of FIG. 4, the seal weld 27a would be broken to permit removal of the cylinder 22a. Suitable maintenance, repairs, and replacement of parts can then be accomplished and the valve reassembled as described.

It is noted that all of the internals are securely maintained in operating positions simply by a quick make-up and releasable connection of the cylinder 22 in the inlet 18 of the valve body 12. The cylinder 22 maintains the guide plate 30 and hence the guides 38 in position, the slide valve 42 is maintained in operating positions by virtue of the interfitting guides and slides 38 and 40. Thus, all valve internals are held in place without the use of any auxiliary connectors, such as screws, nuts and bolts, and the like. This is highly advantageous particularly in very small sized slide valves.

The assembly and disassembly of the valve 10a of FIG. 4 is the same as that of FIGS. 1, 2 and 3.

Accordingly, the present invention is well suited and adapted to attain the objects and ends and has the advantages and features mentioned as well as others inherent therein.

While presently preferred embodiments of the invention have been given for the purpose of disclosure, changes can be made therein which are within the spirit of the invention as defined by the scope of the appended claims.

What is claimed is:

1. A valve comprising, a body having an internal chamber and an inlet and an outlet in fluid communication with the internal chamber and forming a flow passage through the body, a cylinder having a flow passage through it threadedly and releasably secured in the inlet, a value seat disposed on the inner end of the cylinder about the flow passage, a flange disposed on the inner end of the cylinder extending outwardly beyond the inlet, a slide valve slidably disposed in the internal chamber, guides maintained in position in the internal chambers solely by a clamping action of the flange with an internal wall surrounding the inlet, said guides being clamped between the flange and the internal wall, the slide valve having slides slidable in the guides for movement of the slide valve into open, partially open, and closed positions with respect to the valve seat, the output in the body constituting the outlet of the flow passage, and means for moving the slide valve into its positions.

2. A valve comprising,
    a body having an internal chamber and an inlet and an outlet in fluid communication with the internal chamber,
    a cylinder having a flow passage through it threadedly and releasably secured in the inlet,
    a valve seat disposed at the inner end of the cylinder about the flow passage,
    a flange disposed on the inner end of the cylinder extending outwardly beyond the inlet,
    a guide plate having an opening of a size to fit about the cylinder and to engage the flange, the flange clamping the plate against an internal wall surrounding the inlet,
    guides disposed on the guide plate,
    a slide valve having slides slidably disposed in the guides and movable from open to partially open and closed positions with respect to the valve seat,
    the outlet in the body constituting the outlet of the flow passage, and
    means for moving the slide valve into open and closed positions.

3. The valve of claims 1 or 2 where,
    the slide valve has an opening co-extensive with the flow passage through the valve seat whereby when the valve is in open position, the flow passage extends through the slide valve.

4. The valve of claims 1 or 2 where,
    the flow passage in the cylinder is cone shaped.

5. The valve of claim 1 where,
    the internal chamber has an opening of a size sufficient to permit insertion and removal of the cylinder, guides and slide valve, and
    a bonnet releasably secured to the body closing the opening.

6. The valve of claim 2 where,
    the internal chamber has an opening of a size sufficient to permit insertion and removal of the cylinder, guide plate and the slide valve, and
    a bonnet releasably secured to the body closing the opening.

7. The valve of claim 6 where,
    the flow passage in the cylinder is cone shaped.

* * * * *